(12) United States Patent
Kurita et al.

(10) Patent No.: US 10,369,880 B2
(45) Date of Patent: Aug. 6, 2019

(54) POWER TRANSMISSION DEVICE FOR VEHICLE

(71) Applicant: NTN CORPORATION, Osaka (JP)

(72) Inventors: Masao Kurita, Shizuoka (JP);
Hirokazu Ohba, Shizuoka (JP);
Taisuke Igi, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/776,557

(22) PCT Filed: Nov. 18, 2016

(86) PCT No.: PCT/JP2016/084225
§ 371 (c)(1),
(2) Date: Jul. 16, 2018

(87) PCT Pub. No.: WO2017/086429
PCT Pub. Date: May 26, 2017

(65) Prior Publication Data
US 2018/0326833 A1 Nov. 15, 2018

(30) Foreign Application Priority Data
Nov. 20, 2015 (JP) ................... 2015-227619

(51) Int. Cl.
*B60K 6/485* (2007.10)
*B60K 6/48* (2007.10)
*B60K 7/00* (2006.01)
(Continued)

(52) U.S. Cl.
CPC ........... *B60K 6/485* (2013.01); *B60K 6/48* (2013.01); *B60K 7/00* (2013.01); *B60K 7/0007* (2013.01);
(Continued)

(58) Field of Classification Search
CPC .... B60K 6/485; B60K 7/0007; B60K 17/043; B60K 2007/0038; B60K 2007/0061; B60K 6/48; B60K 7/00; B60K 7/0023; B60K 7/18; B62D 7/18; F16H 1/06; B60Y 2200/92; B60Y 2300/18125; B60Y 2410/102
USPC .......................................................... 180/63
See application file for complete search history.

(56) References Cited

U.S. PATENT DOCUMENTS

2006/0158050 A1 7/2006 Maeda et al.
2008/0302590 A1 12/2008 Sato

FOREIGN PATENT DOCUMENTS

DE 90 03 883 8/1991
EP 1 950 072 7/2008
(Continued)

OTHER PUBLICATIONS

Translation of International Preliminary Report on Patentability dated May 22, 2018 in International (PCT) Application No. PCT/JP2016/084225.
(Continued)

*Primary Examiner* — Paul N Dickson
*Assistant Examiner* — Hilary L Johns
(74) *Attorney, Agent, or Firm* — Wenderoth, Lind & Ponack, L.L.P.

(57) ABSTRACT

The power transmission device includes an input shaft that rotates about its axis together with a vehicle wheel. A driving gear is arranged coaxially with the input shaft so as to rotate about the axis of the input shaft together with the input shaft. A driven gear meshes with the driving gear, and configured to transmit a rotational force to an output shaft connected to a regenerative energy converter. A wheel bearing for the vehicle wheel supports the input shaft such that the input shaft is rotatable about its axis relative to the driven gear.

20 Claims, 7 Drawing Sheets

(51) Int. Cl.
 B60K 17/04 (2006.01)
 B62D 7/18 (2006.01)
 F16H 1/06 (2006.01)

(52) U.S. Cl.
 CPC .......... B60K 7/0023 (2013.01); B60K 17/043 (2013.01); B62D 7/18 (2013.01); F16H 1/06 (2013.01); *B60K 2007/0038* (2013.01); *B60K 2007/0061* (2013.01); *B60Y 2200/92* (2013.01); *B60Y 2300/18125* (2013.01); *B60Y 2410/102* (2013.01)

(56) References Cited

FOREIGN PATENT DOCUMENTS

| | | |
|---|---|---|
| FR | 2 776 966 | 10/1999 |
| FR | 2 875 184 | 3/2006 |
| JP | 10-305735 | 11/1998 |
| JP | 10305735 A * | 11/1998 |
| JP | 2008-302892 | 12/2008 |
| JP | 2009-025140 | 2/2009 |
| JP | 2009025140 A * | 2/2009 |
| JP | 2010-030362 | 2/2010 |
| JP | 2013-181645 | 9/2013 |
| JP | 2013181645 A * | 9/2013 |
| JP | 2013-241083 | 12/2013 |
| JP | 2015-147491 | 8/2015 |
| JP | 2015147491 A * | 8/2015 |

OTHER PUBLICATIONS

International Search Report dated Jan. 17, 2017 in International (PCT) Application No. PCT/JP2016/084225.
Extended European Search Report dated Nov. 14, 2018 in European Application No. 16866429.0.

* cited by examiner

POWER TRANSMISSION DEVICE FOR VEHICLE

TECHNICAL FIELD

The present invention relates to a power transmission device for a vehicle for transmitting the driving force of a driving source to a vehicle wheel while supporting the vehicle wheel, particularly to a power transmission device including a power dividing mechanism for partially converting the driving force of the driving source and the braking force of the vehicle wheel into regenerative energy.

BACKGROUND ART

In recent years, hybrid vehicles and plug-in hybrid vehicles, which use both an engine and an electric motor as driving sources for moving the vehicles, are gathering attention because they consume less fuel and emit less exhaust gases. For example, Japanese Unexamined Patent Application Publication No. 2010-30362 discloses a power transmission device for a vehicle mounted to a vehicle wheel, and including a driving force source such as an internal combustion engine, and an auxiliary power source such as an electric motor (motor-generator) capable of powering the vehicle and regeneration. While the vehicle is being powered by the driving force source, the auxiliary power source functions as an auxiliary driving source for the vehicle wheel, whereas the auxiliary power source generates regenerative energy during the regeneration mode, and this regenerative energy is stored in an energy storage device such as a battery.

Japanese Unexamined Patent Application Publication No. 2008-302892 discloses a driving system for a vehicle including a power transmission mechanism for dividing the driving force of an internal combustion engine, and transmitting the divided driving forces to a drive wheel and a generator. This power transmission device includes a ring gear as an output element arranged concentrically with a sun gear to which the rotor of a motor-generator is coupled, and is configured such that the sun gear and the ring gear rotate about their respective axes while revolving around the sun gear due to a carrier coupled to an engine output shaft. A permanent magnet motor is coupled to the ring gear, and provides additional driving torque. With this arrangement, it is possible to regenerate energy with the generator, and change the speed ratio in a stepless manner by changing the revolving speeds of the internal combustion engine and the motor.

PRIOR ART DOCUMENTS

Patent Documents

Patent document 1: Japanese Unexamined Patent Application Publication No. 2010-30362
Patent document 2: Japanese Unexamined Patent Application Publication No. 2008-302892

SUMMARY OF THE INVENTION

Problems to be Solved by the Invention

In JP 2010-30362 and JP 2008-302892, only the driving force from the constant-velocity universal joint is transmitted to the vehicle wheel through a bearing device, and this bearing device is completely different from a vehicle wheel braking device. Therefore, it is impossible to recover, though this bearing device, regenerative energy generated when a braking force is applied to the vehicle wheel. It might be possible to recover regenerative energy though the power train inside of the vehicle, but internal loss is large and regenerative energy cannot be recovered efficiently.

It is an object of the present invention to efficiently recover regenerative energy from the rotational force (driving force) of a vehicle wheel.

Summary of the Invention

In order to achieve the above object, the present invention provides a power transmission device for a vehicle, the power transmission device comprising: an input shaft configured to rotate about an axis of the input shaft together with a vehicle wheel; a driving gear arranged coaxially with the input shaft, and configured to rotate about the axis of the input shaft together with the input shaft: a driven gear meshing with the driving gear, and configured to transmit a rotational force to an output shaft connected to a regenerative energy converting device; and a wheel bearing supporting the input shaft such that the input shaft is rotatable about the axis of the input shaft relative to the driven gear.

If the driving gear is arranged coaxially with the input shaft in this way, by dividing a rotational force (driving force) through the driving gear, it is possible to efficiently recover regenerative energy both when a rotational force is transmitted from a driving source to the vehicle wheel, and when a braking force is applied to the vehicle wheel. Also, this power transmission device is versatile, because it is possible to simply replace a conventional power transmission device with this power transmission device without altering the existing power train.

The power transmission device may further comprise a knuckle bracket configured to retain the driven gear such that the driven gear is rotatable about an axis of the driven gear, and the wheel bearing may include an inner member fitted to the input shaft; an outer member fitted to the knuckle bracket; and rolling elements disposed between the inner member and the outer member. With this arrangement, it is possible to rotate the driven gear relative to the driving gear in a more stable manner, and thus to efficiently recover regenerative energy.

In the power transmission device, the input shaft may have a constant diameter portion having a constant outer diameter, and a radially expanding portion having an outer diameter continuously increasing from the constant diameter portion, and the inner member may include a hub ring having a raceway, and an inner race having a raceway, and the hub ring may be fitted to the constant diameter portion, and the inner race is fitted to the radially expanding portion. If the inner member is constituted by the hub ring and the inner race in this way, it is possible to more easily assemble the bearing for a vehicle wheel.

In the power transmission device, the knuckle bracket and the outer member may be constituted by an integral member. If the knuckle bracket and the outer member are constituted by an integral member, it is possible to reduce the number of the components of the power transmission device, and thus to assemble the power transmission device more easily.

The power transmission device may further comprise a constant-velocity universal joint to which the input shaft is coupled, and which is configured to transmit a rotational force about an axis of the constant-velocity universal joint to the input shaft under a driving force of a driving source. By coupling the input shaft to the constant-velocity universal joint, the driving force input from the input shaft to the vehicle wheel can be partially transmitted directly to the energy converting device, thereby making it possible to efficiently recover regenerative energy.

Effects of the Invention

The power transmission device for a vehicle of the present invention comprises: an input shaft configured to rotate about an axis of the input shaft together with a vehicle wheel; a driving gear arranged coaxially with the input shaft, and configured to rotate about the axis of the input shaft together with the input shaft: a driven gear meshing with the driving gear, and configured to transmit a portion of a rotational force to an output shaft connected to a regenerative energy converting device; and a wheel bearing, the wheel bearing supporting the input shaft such that the input shaft is rotatable about the axis of the input shaft relative to the driven gear. If the driving gear is arranged coaxially with the input shaft in this way, by dividing a rotational force (driving force) through the driving gear (i.e., drawing off a portion of the rotation force via the driving gear), it is possible to efficiently recover regenerative energy both when a rotational force is transmitted from a driving source to the vehicle wheel, and when a braking force is applied to the vehicle wheel. Also, this power transmission device is versatile, because it is possible to simply replace a conventional power transmission device with this power transmission device without altering the existing power train.

DETAILED THE INVENTION

Figure 1:
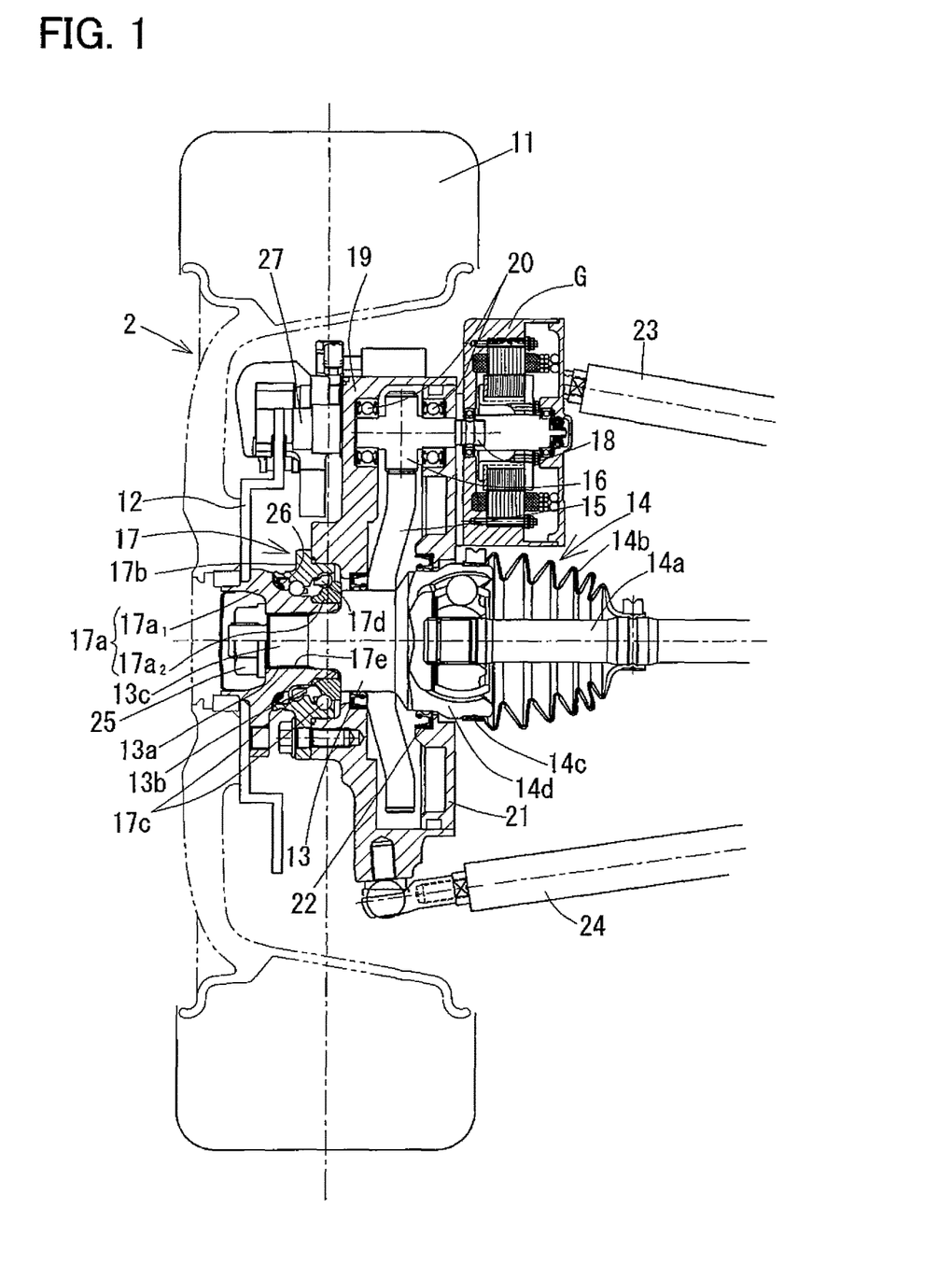
FIG. 1 is a vertical sectional view of a power transmission device for a vehicle according to a first embodiment of the present invention (mounted to a driving wheel of the vehicle), when seen from the front side of the vehicle.
Figure 2A:
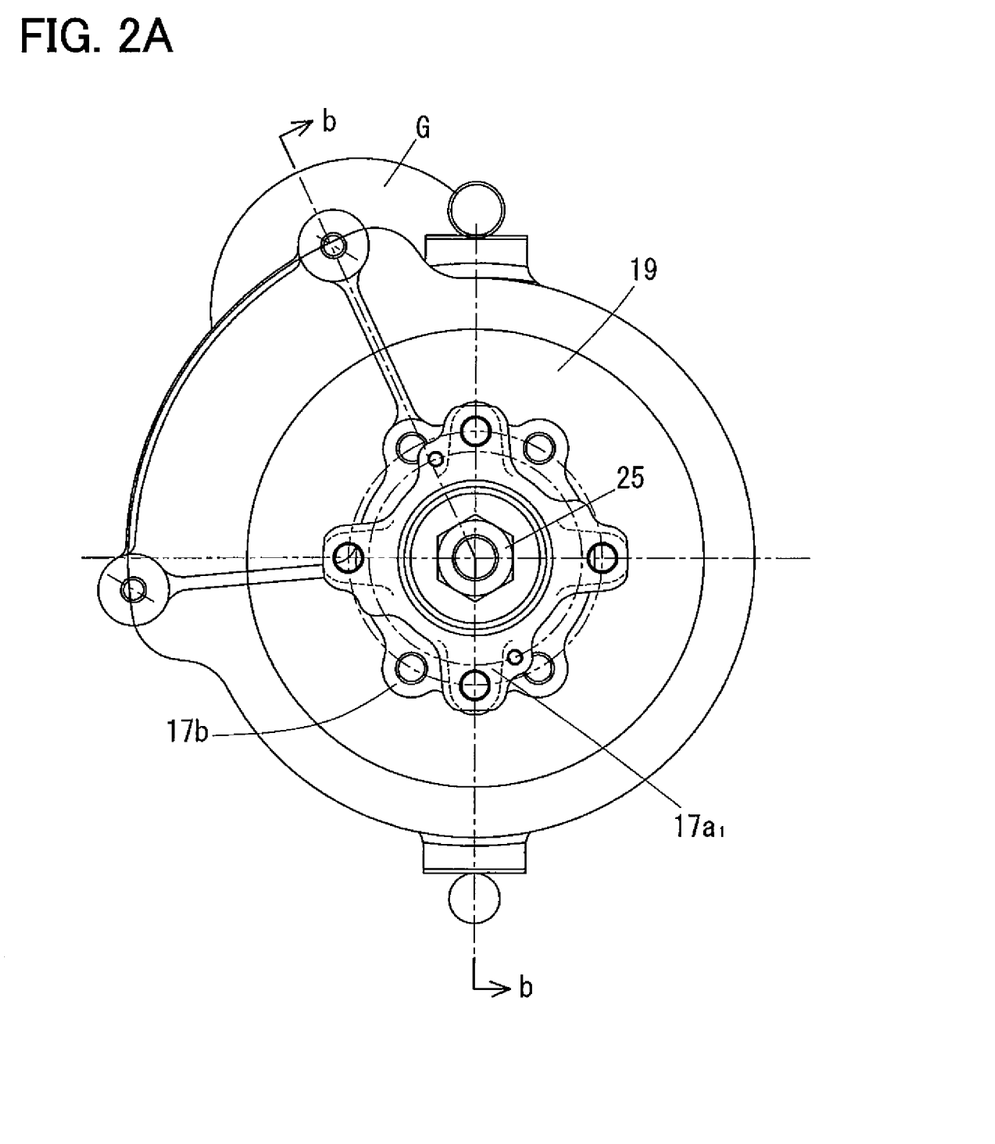
FIG. 2A is a side view of the power transmission device of FIG. 1.
Figure 2B:
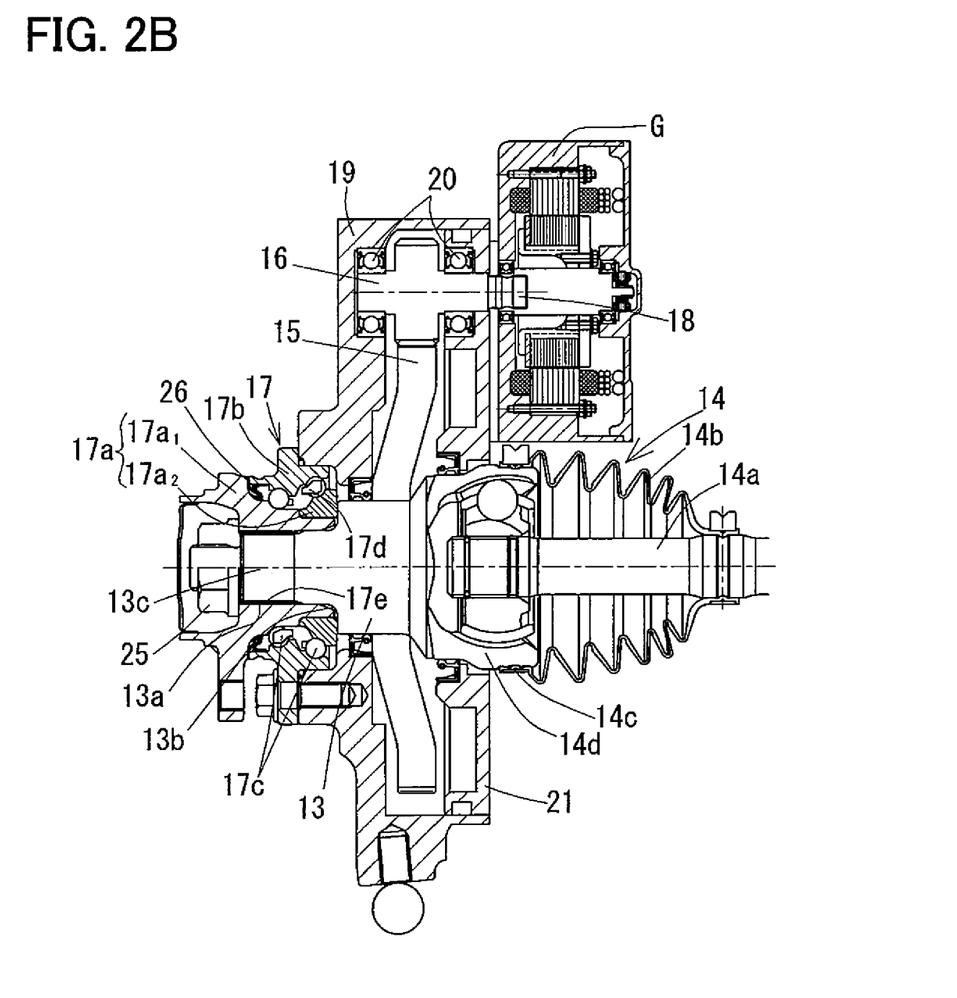
FIG. 2B is a vertical sectional view taken along line b-b of FIG. 2A, and illustrating the power transmission device of FIG. 1 with a tire, a brake disk, etc. removed from the device.
Figure 3:
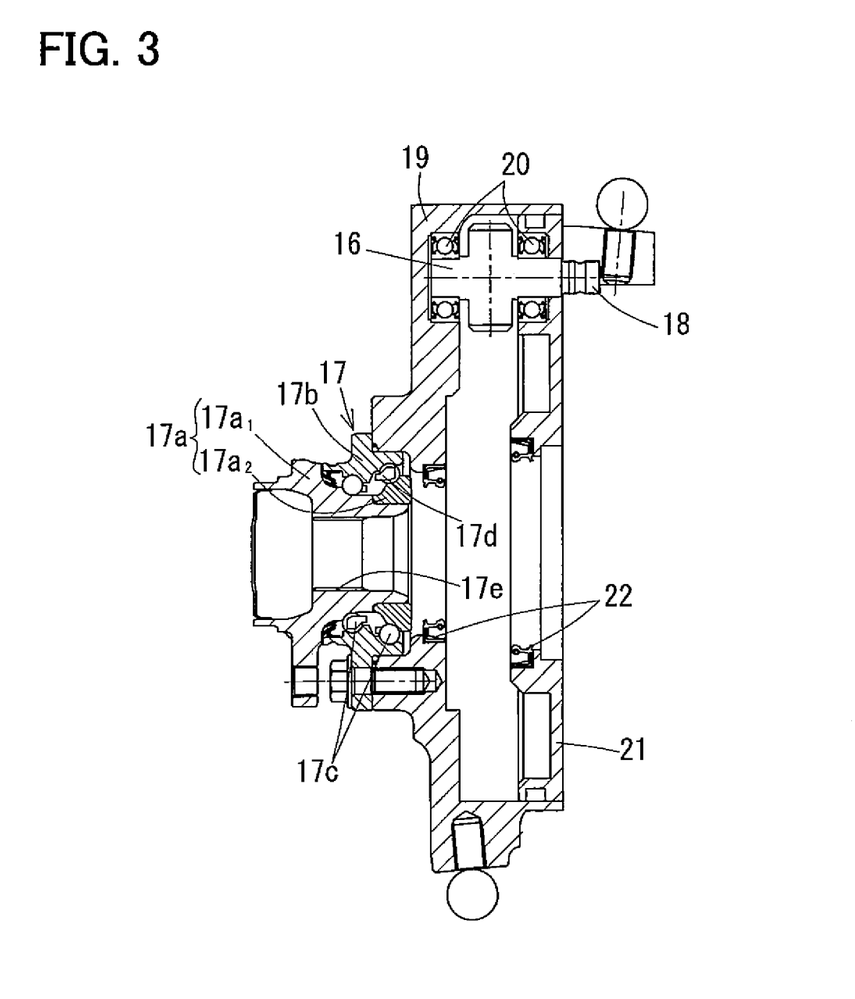
FIG. 3 is a vertical sectional view of the power transmission device of FIG. 2B with an input shaft, and a constant-velocity universal joint, etc. further removed from the device.

FIGS. 1 to 3 illustrate a power transmission device 10 for a vehicle according to the first embodiment of the present invention. FIG. 1 is a vertical sectional view of the power transmission device 10 when seen from the front side of the vehicle 1 (shown in FIG. 4). FIG. 2A is a side view of the power transmission device 10. FIG. 2B shows a vertical section of the power transmission device 10 with a tire 11, a brake disk 12, etc. removed. FIG. 3 shows a vertical section of the power transmission device 10 with an input shaft 13, a constant-velocity universal joint 14, etc. (shown in FIG. 2B) further removed. The power transmission device according to the first embodiment includes, as its main components, a driving gear 15, a driven gear 16, and a wheel bearing 17, and is mounted to a drive wheel 2 of the vehicle 1.

Figure 4:
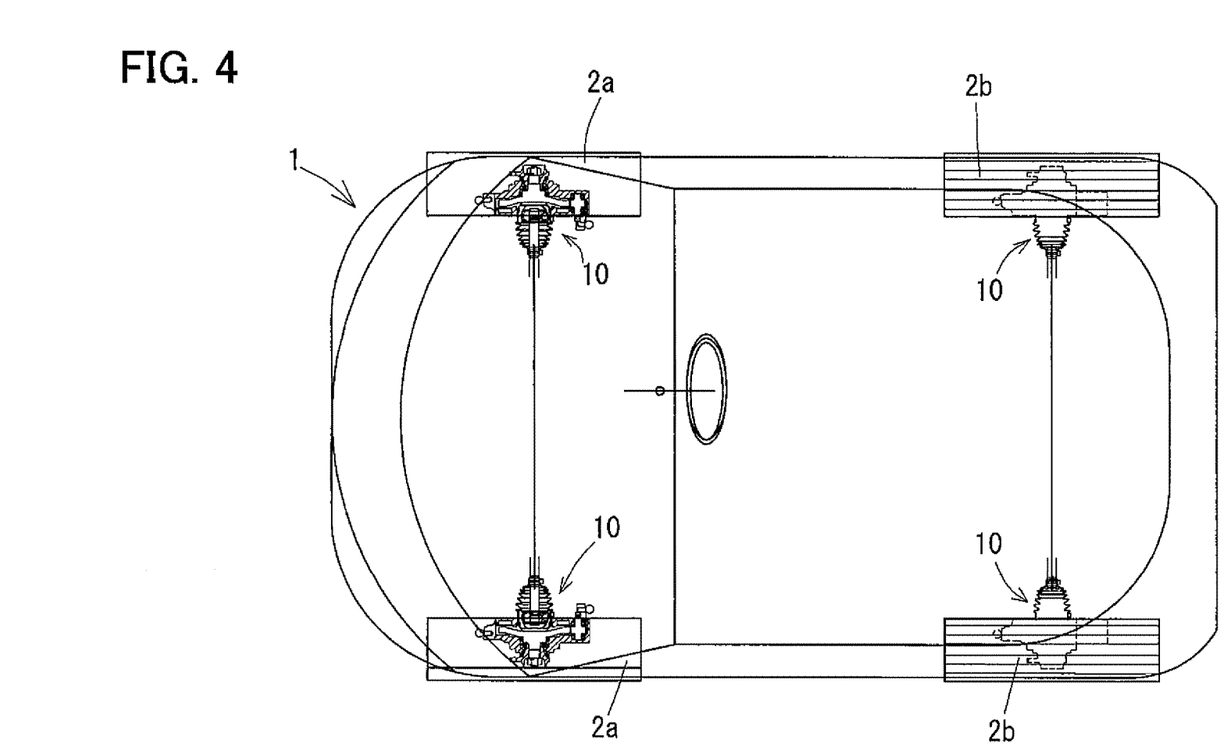
FIG. 4 is a plan view of the vehicle of which the power transmission device of FIG. 1 is mounted to each wheel.

For efficient recovery of regenerative energy, as illustrated in FIG. 4, four power transmission devices 10 each comprising the power transmission device 10 according to the present invention are preferably mounted to all of the four wheels 2 of the vehicle 1. However, only two such power transmission devices 10 may be mounted to either the respective front wheels 2a or the respective rear wheels 2b of the four wheels 2 of the vehicle 1. In FIG. 4, the left side is the front side of the vehicle 1. The power transmission device 10 of the present invention can be mounted to both small-sized vehicle wheels and large-sized vehicle wheels.

The driving gear 15 of the power transmission device 10 according to the first embodiment of the present invention is arranged coaxial with the input shaft 13, which is coaxially coupled to the constant-velocity universal joint 14, and is configured to be rotatable about the axis of the input shaft 13 together with the input shaft 13. The shaft 14a of the constant-velocity universal joint 14 is coupled to a driving source (not shown) such as an engine such that the input shaft 13, to which the constant-velocity universal joint 14 is coupled, rotates about its axis when the driving source is driven, and this rotational force (driving force) is transmitted to the wheel 2. The constant-velocity universal joint 14 includes a boot 14b fixed to an outer member 14d of the joint 14 by a boot band 14c. The boot 14b prevents dust, muddy water, etc. from entering the constant-velocity universal joint 14.

The driven gear 16, which meshes with the driving gear 15, has teeth smaller in number than the teeth of the driving gear 15 such that, when the torque of the driving gear 15 is transmitted to the driven gear 16, the driven gear 16 is rotated at a higher speed than the driving gear 15 according to the ratio between the numbers of teeth of the gears 15 and 16. An output shaft 18 is mounted to the driven gear 16 so as to be coaxial with the driven gear 16, and is connected to an energy converting device (not shown). Thus, in view of the above, the driving gear 15 is configured to draw off a portion of the rotational force from the input shaft 13 produced by the driving source. The driven gear 16 meshing with the driving gear 15 transmits the portion of the rotational force from the driving source to the output shaft 18 connected to the regenerative energy converter.

The numbers of the teeth of the driving and driven gears 15 and 16 may be appropriately altered in view of several conditions, e.g., the maximum allowable rotational speed of the wheel bearing 17, and the magnitude of the torque transmitted from the output shaft 18 to the energy converting device. While, in the embodiment, the power transmission device is configured such that the rotational force of the driving gear 15 is directly transmitted to the driven gear 16, another gear may be disposed between the driving gear 15 and the driven gear 16. Also, while, in the embodiment, spur gears are used as the driving and driven gears 15 and 16 so that the input and output shafts 13 and 18, which comprise rotary shafts, extend parallel to each other, for example, helical gears may be used as the driving and driven gears 15 and 16 so that the input and output shafts 13 and 18 form a predetermined angle, such as a right angle, with each other.

The energy converting device converts the rotational force transmitted by the output shaft 18 while rotating about its axis, to regenerative energy such as electricity or pressure. For example, to recover regenerative energy as electrical energy, a motor-generator G is used as the energy converting device, and to recover regenerative energy as pressure energy such as air pressure, a compressor is used. In FIG. 1, a motor generator G is mounted to the output shaft 18 as the energy converting device. The electric energy recovered by the motor generator G is temporarily stored in a battery (not shown), and is reused to power the vehicle 1 (shown in FIG. 4). The energy converting device may also be an actuator rather than a motor-generator G or a compressor.

The wheel bearing 17 supports the input shaft 13 such that the input shaft 13 is rotatable about its axis relative to the driven gear 16, and includes an inner member 17a; an outer member 17b; rolling elements 17c disposed between the inner member 17a and the outer member 17b; and a retainer 17d configured to retain the rolling elements 17c such that the rolling elements 17c are spaced apart from each other at predetermined intervals in the rotational direction thereof.

A knuckle bracket 19 is mounted to the input shaft 13 so as to be coaxial with the input shaft 13. The knuckle bracket 19 has a through hole which extends on the center axis of the knuckle bracket 19, and through which the input shaft 13 is inserted. A recess is formed in the interior of the knuckle bracket 19 such that the driving and driven gears 15 and 16 are received in the recess. Bearings 20 are mounted between the driven gear 16 and the inner surface of the knuckle bracket 19, and retain the driven gear 16 such that the driven gear 16 is rotatable about its axis relative to the knuckle bracket 19. The recess of the knuckle bracket 19 is closed by a cover 21.

Grease seals 22 are mounted, respectively, between the knuckle bracket 19 and the input shaft 13 and between the cover 21 and the constant-velocity universal joint 14, thereby preventing the lubricating grease filling the knuckle bracket 19 from leaking out of the knuckle bracket 19, and also preventing dust, muddy water, etc. from entering the knuckle bracket 19. An upper arm 23 is coupled to the upper end of the knuckle bracket 19, and a lower arm 24 is coupled to the lower end of the knuckle bracket 19.

The input shaft 13 has an end closer to the wheel 2, and the end is constituted by a constant diameter portion 13a having a constant outer diameter, and a radially expanding portion 13b having an outer diameter continuously increasing from the constant diameter portion 13a. The inner member 17a is constituted by a hub ring 17$a_1$ and an inner race 17$a_2$ which are fitted on the constant diameter portion 13a and the radially expanding portion 13b, respectively, while fitted to each other so as to be non-rotatable about the axis of the input shaft 13 relative to each other. The constant diameter portion 13a has serrations 13c axially extending on the outer peripheral surface thereof, whereas the hub ring 17$a_1$ has grooves 17e formed in the inner peripheral surface thereof such that the serrations 13c are fitted in the respective grooves 17e, thereby enabling the input shaft 13 and the hub ring 17$a_1$ to rotate together about the axis of the input shaft 13. A center nut 25 is mounted to the end of the input shaft 13. By adjusting the amount by which the center nut 25 is screwed onto the input shaft 13, it is possible to adjust the amount of the preload applied to the constant-velocity universal joint 14.

The outer member 17b is fitted to the inner peripheral edge of the through hole of the knuckle bracket 19. If the outer member 17b and the knuckle bracket 19 are constituted by separate members as shown, it is possible to select optimal materials individually for the outer member 17b and the knuckle bracket 19. For example, the outer member 17b, for which sufficient strength is required, may be made of steel, whereas the knuckle bracket 19, for which strength is not required so much, may be made of a lightweight material such as an aluminum alloy. By using such materials, it is possible to reduce the overall weight of the power transmission device while maintaining the required strength of the device.

The outer member 17b has double-row inner raceways on its inner peripheral surface. The inner member 17a, which is constituted by the hub ring 17$a_1$ and the inner race 17$a_2$, has, on its outer peripheral surface, outer raceways opposed to the inner raceways. Balls as the rolling elements 17c are disposed between the inner raceways and the outer raceways. The wheel bearing 17 is therefore a double-row angular ball bearing in the embodiment. However, the wheel bearing 17 may be instead a double-row tapered roller bearing in which tapered rollers are used.

A grease seal 26 is mounted between the end of the outer member 17b and the hub ring 17$a_1$, thereby preventing the lubricating grease stored between the outer raceways of the inner member 17a and the inner raceways of the outer member 17b from leaking out of the wheel bearing 17, and further preventing dust, muddy water, etc. from entering the space between the outer raceways and the inner raceways.

The brake disk 12 is fixed to the hub ring 17$a_1$, and rotates about the axis of the input shaft 13 when the input shaft 13 (wheel 2) rotates. A brake caliper 27 is mounted to the knuckle bracket 19. By actuating the brake caliper 27, it is possible to axially sandwich the brake disk 12, thereby mechanically applying a braking force to the rotating wheel 2.

While the vehicle 1 is being powered by a driving source such as an engine, the driving force transmitted from the driving source rotates the input shaft 13 about its axis. The rotational force is transmitted to the output shaft 18 through the driving gear 15 and the driven gear 16, and the energy converting device is driven by the rotational force of the output shaft 18, thereby recovering regenerative energy. On the other hand, when a braking force is applied to the vehicle 1, the rotation of the wheel 2 is transmitted to the input shaft 13 as a reverse input. The rotational force of the input shaft 13 is transmitted to the output shaft 18 through the driving gear 15 and the driven gear 16, and the energy converting device is driven by the rotational force of the output shaft 18, thereby recovering regenerative energy.

Figure 5:
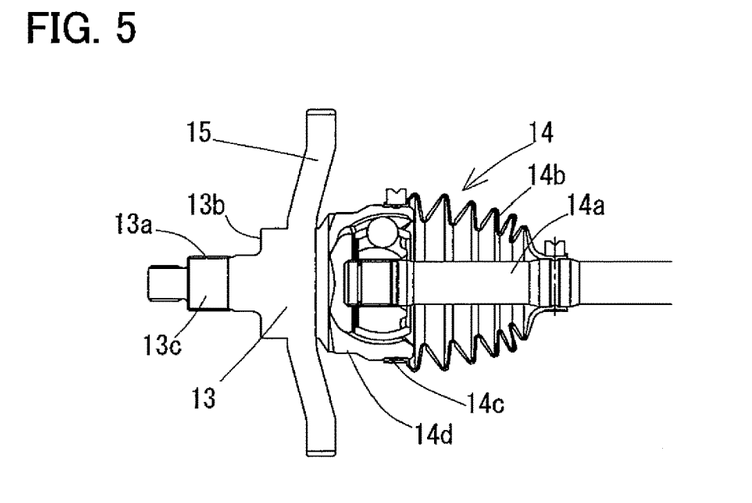
FIG. 5 is a vertical sectional view illustrating a variation of the input shaft used in the power transmission device of FIG. 1.
Figure 6:
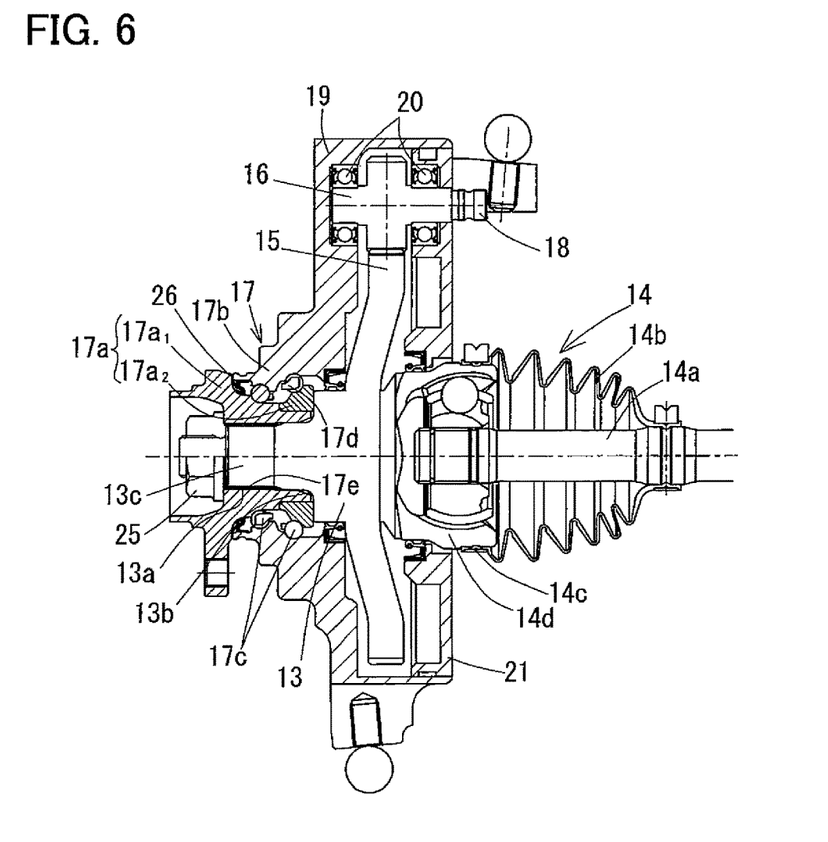
FIG. 6 is a vertical sectional view of a power transmission device in which the input shaft of FIG. 5 is used, and in which the outer member of a bearing and a knuckle bracket constitute an integral member, when seen from the front side of the vehicle.

FIGS. 5 and 6 illustrate a modification of the power transmission device 10 illustrated in FIG. 1. In particular, FIG. 6 shows a vertical section of the modified power transmission device 10, as seen from the front side of the vehicle 1, and FIG. 5 shows a vertical section of an input shaft 13 of the modified power transmission device 10, as seen from the front side of the vehicle 1. In FIG. 6, the motor-generator G is not shown. The power transmission device 10 of FIGS. 1, 2A and 2B differs from the modified power transmission device 10 of FIGS. 5 and 6 in that, in the former, the input shaft 13 and the driving gear 15 are constituted by separate members assembled together, and the outer member 17b and the knuckle bracket 19 are also constituted by separate members assembled together whereas in the latter, the input shaft 13 and the driving gear 15 are constituted by an integral member, and the outer member 17b and the knuckle bracket 19 are also constituted by an integral member.

By using such integral members, it is possible to design the power transmission device more freely, and thus it is possible to reduce the size of the power transmission device at the design stage. Also, by using such integral members, it is possible to reduce the number of the components of the power transmission device, and thus to reduce the time required for assembling the power transmission device. As a result thereof, it is possible to reduce costs.

Figure 7:
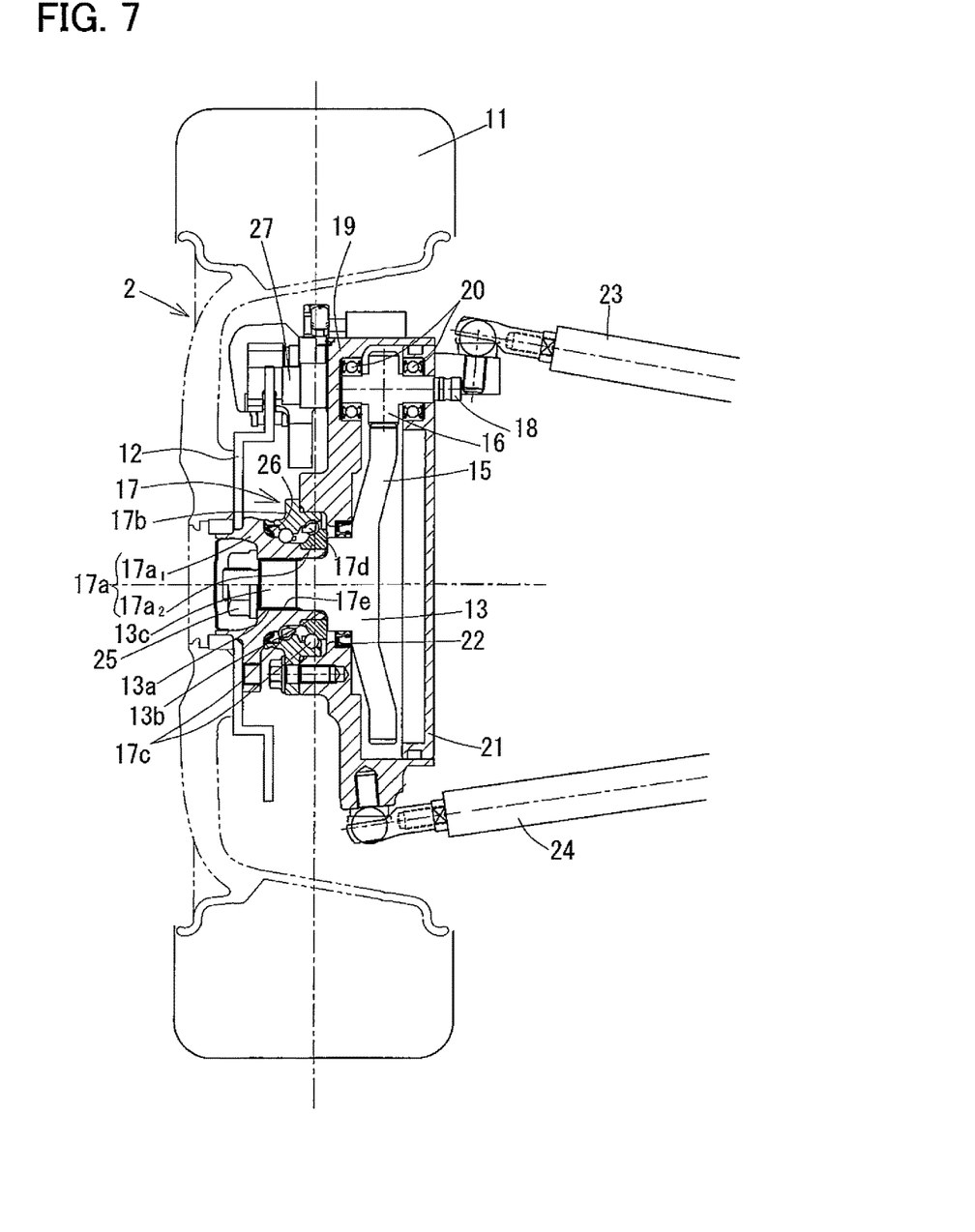
FIG. 7 is a vertical section view of a power transmission device for a vehicle according to a second embodiment of the present invention (mounted to a driven wheel of the vehicle), when seen from the front side of the vehicle.

FIG. 7 shows a vertical section of a power transmission device 10 for a vehicle according to the second embodiment of the present invention, when seen from the front side of the vehicle 1. The power transmission device 10 of the second embodiment is identical to the power transmission device 10 of the first embodiment in that the driving gear 15, the driven gear 16, the wheel bearing 17 are used as main components. However, the power transmission device 10 of the second embodiment is different from the power transmission device 10 of the first embodiment in that a constant-velocity universal joint 14 is not coupled to the input shaft 13 of the former device 10, and the former device 10 is mounted not to a drive wheel 2a but to a non-drive wheel 2b (see FIG. 4). The power transmission device of the second embodiment is configured such that only the reverse input from the wheel 2 is transmitted, through the driving gear 15 and the driven gear 16, to an energy converting device (not shown) such as a motor-generator, thereby recovering regenerative energy.

The power transmission devices 10 of the above embodiments are the most suitable for a vehicle 1, but can be used for various devices other than a vehicle 1 that include a mechanism for dividing the driving force of a driving source, and transmitting the divided driving forces to a plurality of devices.

The power transmission devices 10 of the above embodiments are merely examples. For example, the shapes, the arrangements, and the number of the components of the power transmission device 10 are not limited to the above embodiments, i.e., may be modified as necessary under the condition that the object of the present invention can be achieved, i.e., regenerative energy can be efficiently recovered from the rotational force of the wheel 2.

DESCRIPTION OF REFERENCE NUMERALS

1: vehicle
2: wheel (of the vehicle 1)
2a: front wheel
2b: rear wheel
10: power transmission device for a vehicle
11: tire
12: brake disk
13: input shaft
13a: constant diameter portion
13b: radially expanding portion
13c: serration
14: constant-velocity universal joint
14a: shaft
14b: boot
14c: boot band
14d: outer member
15: driving gear
16: driven gear
17: bearing for a vehicle wheel
17a: inner member
17$a_1$: hub ring
17$a_2$: inner race
17b: outer member
17c: rolling element
17d: retainer
17e: groove
18: output shaft
19: knuckle bracket
20: bearing
21: cover
22: grease seal
23: upper arm
24: lower arm
25: center nut
26: grease seal
27: brake caliper
G: motor-generator

The invention claimed is:

1. A power transmission device for a vehicle, the power transmission device comprising:
a drive shaft for transmitting a driving force from a driving source to a wheel of the vehicle, the drive shaft having a first end to be coupled to the driving source and a second end opposite the first end;
an input shaft connected to the second end of the drive shaft to receive the driving force from the drive shaft in the form of a rotational force, the input shaft being configured to rotate about an axis of the input shaft together with the wheel of the vehicle;
a driving gear arranged coaxially with the input shaft, the driving gear being configured to rotate about the axis of the input shaft together with the input shaft;
a regenerative energy converter configured to convert rotational force to regenerative energy;
a driven gear meshing with the driving gear so as to be rotated by the driving gear, the driven gear being configured to transmit a portion of the rotational force to an output shaft connected to the regenerative energy converter, the driving gear being configured to draw off the portion of the rotational force from the input shaft; and
a wheel bearing supporting the input shaft such that the input shaft is rotatable about the axis of the input shaft relative to the driven gear.

2. The power transmission device according to claim 1, further comprising a knuckle bracket configured to retain the driven gear such that the driven gear is rotatable about an axis of the driven gear,
wherein the wheel bearing includes:
an inner member fitted to the input shaft;
an outer member fitted to the knuckle bracket; and
rolling elements disposed between the inner member and the outer member.

3. The power transmission device according to claim 2, wherein the input shaft has a constant diameter portion having a constant outer diameter, and a radially expanding portion having an outer diameter continuously increasing from the constant diameter portion,
wherein the inner member includes a hub ring having a raceway, and an inner race having a raceway, and
wherein the hub ring is fitted to the constant diameter portion, and the inner race is fitted to the radially expanding portion.

4. The power transmission device according to claim 2, wherein the knuckle bracket and the outer member have an integrated one-piece construction.

5. The power transmission device according to claim 1, further comprising a constant-velocity universal joint to which the input shaft is coupled, the constant-velocity universal joint being configured to transmit the rotational force about an axis of the constant-velocity universal joint to the input shaft under the driving force of the driving source via the drive shaft.

6. The power transmission device according to claim 3, wherein the knuckle bracket and the outer member have an integrated one-piece construction.

7. The power transmission device according to claim 2, wherein the input shaft is coupled to a constant-velocity universal joint such that the rotational force about an axis of the constant-velocity universal joint is transmitted to the input shaft from the drive shaft under the driving force of the driving source.

8. The power transmission device according to claim 3, wherein the input shaft is coupled to a constant-velocity universal joint such that the rotational force about an axis of the constant-velocity universal joint is transmitted to the input shaft from the drive shaft under the driving force of the driving source.

9. The power transmission device according to claim 4, wherein the input shaft is coupled to a constant-velocity universal joint such that the rotational force about an axis of the constant-velocity universal joint is transmitted to the input shaft from the drive shaft under the driving force of the driving source.

10. The power transmission device according to claim 6, wherein the input shaft is coupled to a constant-velocity universal joint such that the rotational force about an axis of the constant-velocity universal joint is transmitted to the input shaft from the drive shaft under the driving force of the driving source.

11. The power transmission device according to claim 1, wherein the regenerative energy converter comprises a motor generator.

12. The power transmission device according to claim 1, wherein the regenerative energy converter comprises a compressor.

13. The power transmission device according to claim 1, wherein the regenerative energy converter comprises an actuator.

14. A power transmission device for a vehicle, the power transmission device comprising:
an input shaft configured to rotate about an axis of the input shaft together with a wheel of the vehicle;
a driving gear arranged coaxially with the input shaft, the driving gear being configured to rotate about the axis of the input shaft together with the input shaft;
a driven gear meshing with the driving gear, the driven gear being configured to transmit a portion of a rotational force from the input shaft to an output shaft connected to a regenerative energy converter;
a knuckle bracket having a recess accommodating the driving gear and the driven gear, the knuckle bracket having a cover for enclosing the driving gear and the driven gear within the knuckle bracket;
a wheel bearing supporting the input shaft such that the input shaft is rotatable about the axis of the input shaft relative to the driven gear.

15. The power transmission device according to claim 14, wherein the knuckle bracket is configured to retain the driven gear such that the driven gear is rotatable about an axis of the driven gear,
wherein the wheel bearing includes:
an inner member fitted to the input shaft;
an outer member fitted to the knuckle bracket; and
rolling elements disposed between the inner member and the outer member.

16. The power transmission device according to claim 15, wherein the input shaft is coupled to a constant-velocity universal joint such that the rotational force about an axis of the constant-velocity universal joint is transmitted to the input shaft under a driving force of a driving source.

17. The power transmission device according to claim 15, wherein the input shaft has a constant diameter portion having a constant outer diameter, and a radially expanding portion having an outer diameter continuously increasing from the constant diameter portion,
wherein the inner member includes a hub ring having a raceway, and an inner race having a raceway, and
wherein the hub ring is fitted to the constant diameter portion, and the inner race is fitted to the radially expanding portion.

18. The power transmission device according to claim 17, wherein the knuckle bracket and the outer member have an integrated one-piece construction.

19. The power transmission device according to claim 15, wherein the knuckle bracket and the outer member have an integrated one-piece construction.

20. The power transmission device according to claim 14, further comprising a constant-velocity universal joint to which the input shaft is coupled, the constant-velocity universal joint being configured to transmit the rotational force about an axis of the constant-velocity universal joint to the input shaft under a driving force of a driving source.

* * * * *